(12) United States Patent
He et al.

(10) Patent No.: US 7,294,078 B2
(45) Date of Patent: *Nov. 13, 2007

(54) OVER-MOLDED BEADED CABLE FOR DRIVING APPLICATIONS

(75) Inventors: Xinhua (Sam) He, Troy, MI (US); Mansour Ashtiani, Beverly Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 266 days.

This patent is subject to a terminal disclaimer.

(21) Appl. No.: 10/447,027

(22) Filed: May 28, 2003

(65) Prior Publication Data

US 2003/0220165 A1    Nov. 27, 2003

Related U.S. Application Data

(63) Continuation-in-part of application No. 10/153,016, filed on May 21, 2002, now Pat. No. 6,849,016.

(51) Int. Cl.
*F16G 1/22* (2006.01)
*F16G 1/28* (2006.01)
*F16G 13/06* (2006.01)

(52) U.S. Cl. .............. 474/203; 474/154; 474/156; 59/78.1

(58) Field of Classification Search ........ 474/152–156, 474/148, 203, 252–258, 260, 263; 29/460, 29/527.3; 72/466, 478; 59/78, 78.1, 2, 95; 451/38; 74/502.3, 502.2, 502.6; 604/528
See application file for complete search history.

(56) References Cited

U.S. PATENT DOCUMENTS

| | | | | | |
|---|---|---|---|---|---|
| 276,619 | A | * | 5/1883 | Mills .......................... | 474/153 |
| 538,222 | A | * | 4/1895 | Davids ........................ | 474/203 |
| 1,327,925 | A | * | 1/1920 | Stanislawa ................... | 474/154 |
| 3,091,030 | A | * | 5/1963 | Zumbrunnen ................. | 29/460 |
| 3,494,214 | A | * | 2/1970 | Egli ............................. | 474/203 |
| 3,517,565 | A | * | 6/1970 | Smith ......................... | 474/203 |
| 3,540,301 | A | * | 11/1970 | Bartz .......................... | 474/148 |
| 3,643,792 | A | * | 2/1972 | Resener ...................... | 198/834 |
| 3,777,586 | A | * | 12/1973 | Stirton ........................ | 474/256 |
| 4,201,968 | A | * | 5/1980 | Parisi et al. .................. | 338/28 |

(Continued)

FOREIGN PATENT DOCUMENTS

DE    2908856 A   *   9/1980

(Continued)

*Primary Examiner*—Marcus Charles
(74) *Attorney, Agent, or Firm*—Doug D. Fekete

(57) ABSTRACT

An over-molded beaded driving cable which has an inner core, a plurality of inner core structures. An outer jacket may encompass the inner core and inner core structures. Each of a plurality of outer beads concentrically surrounds an inner core structure. The outer beads are over-molded in this position, forming an interlocking inner core structure and outer bead configuration capable of high load and high flexible performance. An end fitting placed at each end portion of the inner core provides for a driving cable assembly with a variety of end fitting configurations, including a closed loop connection, for automotive and non-automotive applications. Alternatively, the over-molded beaded driving cable has a plurality of clamps and/or pins surrounded by the outer beads respectively. The cables may also be provided with seamless connection structure for forming closed loops.

29 Claims, 6 Drawing Sheets

U.S. PATENT DOCUMENTS

| | | | |
|---|---|---|---|
| 4,214,488 A * | 7/1980 | Conrad | 474/148 |
| 4,795,410 A * | 1/1989 | Alderfer | 474/256 |
| 5,006,097 A * | 4/1991 | Cook | 474/154 |
| 5,836,199 A * | 11/1998 | Loud | 59/78.1 |
| 6,092,336 A | 7/2000 | Wright et al. | |
| 6,344,037 B1 * | 2/2002 | Suorsa et al. | 604/528 |
| 6,367,864 B2 | 4/2002 | Rogers, Jr. et al. | |
| 6,390,535 B1 | 5/2002 | Chapman | |
| 6,561,569 B1 | 5/2003 | Risdon et al. | |
| 6,606,921 B2 * | 8/2003 | Noetzold | 74/502.3 |
| 6,612,198 B2 | 9/2003 | Rouleau et al. | |

FOREIGN PATENT DOCUMENTS

| | | | | |
|---|---|---|---|---|
| GB | 2106723 A * | 4/1983 | | 451/38 |
| NL | 1002094 C2 * | 7/1997 | | |

* cited by examiner

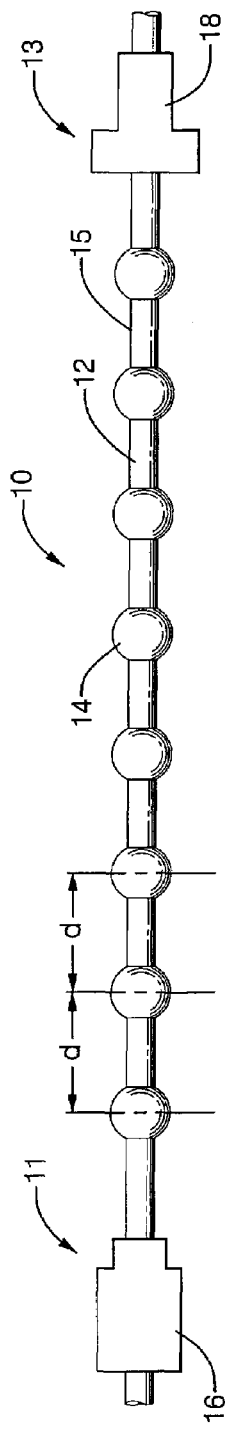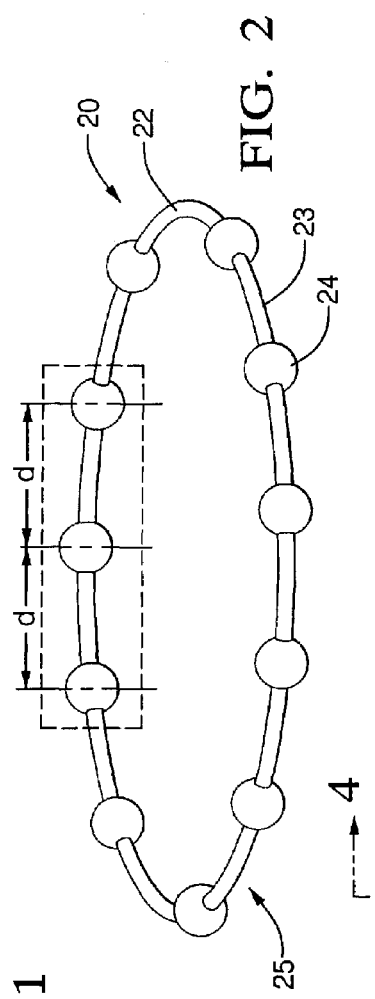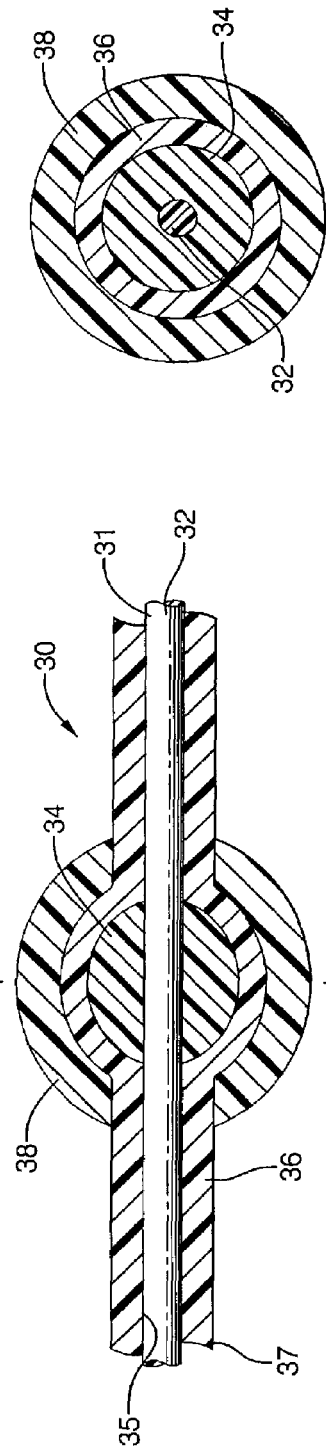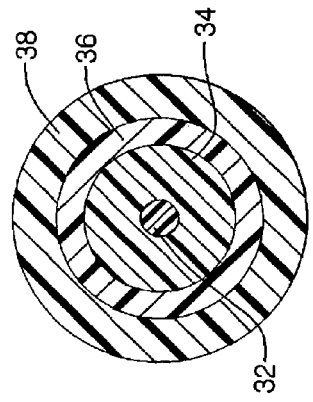

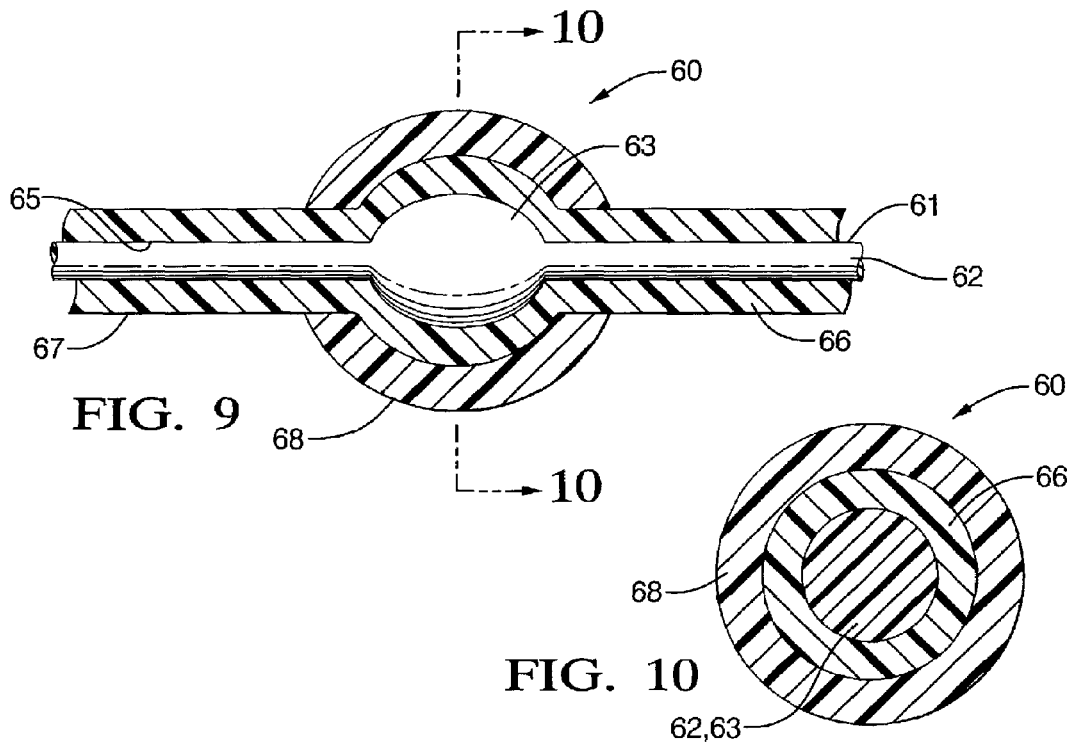
FIG. 9
FIG. 10
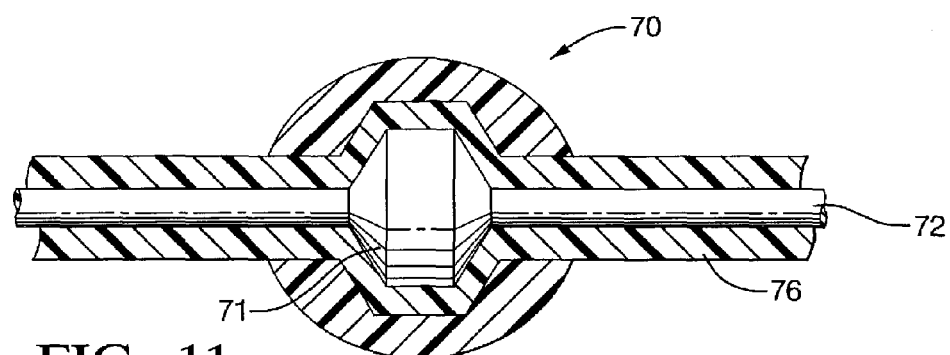
FIG. 11
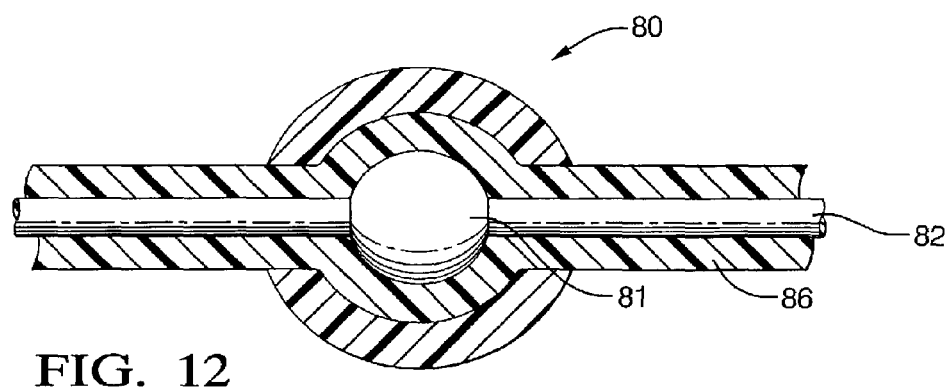
FIG. 12

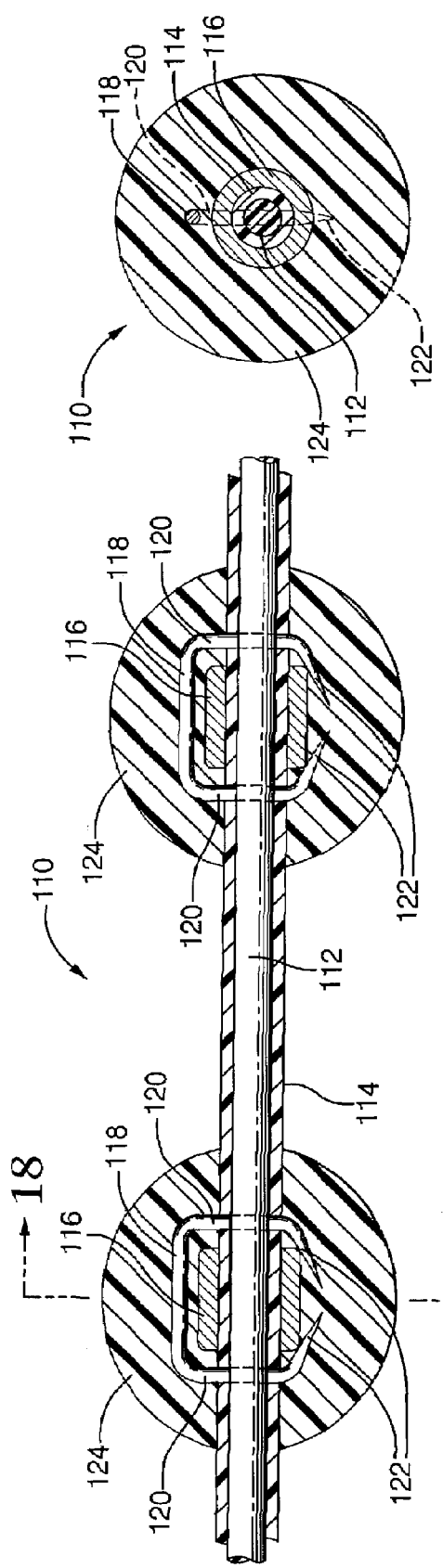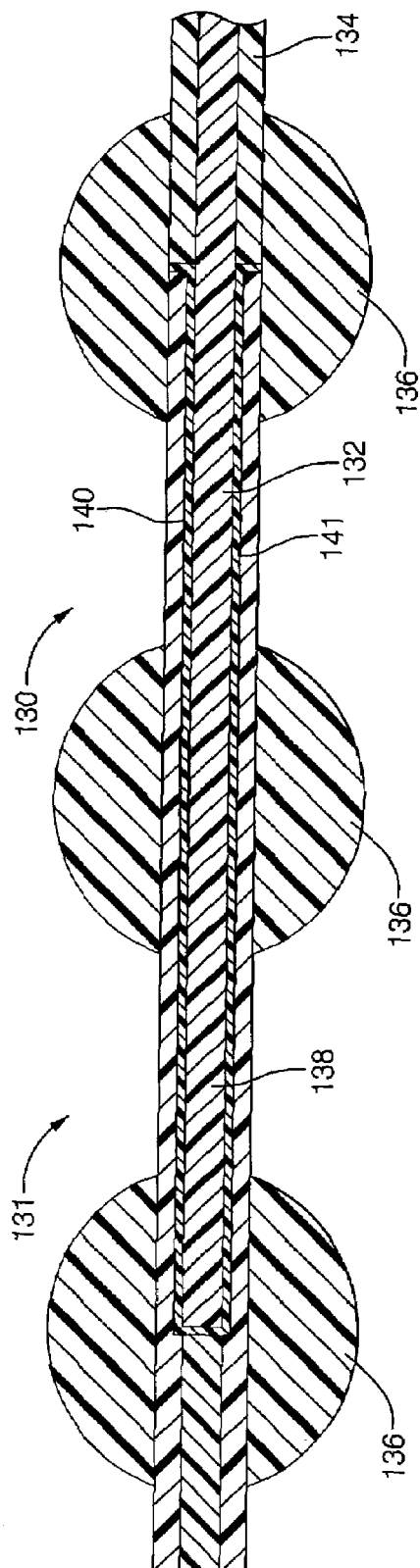

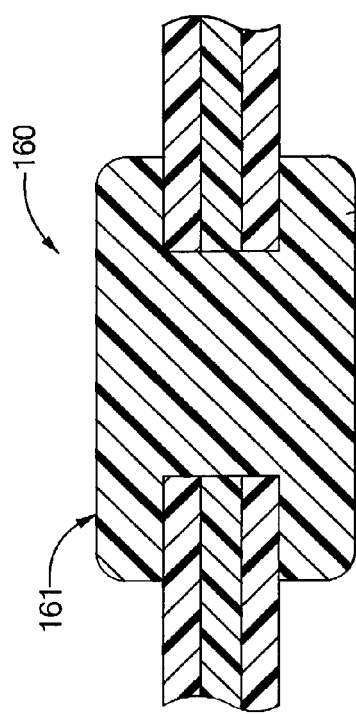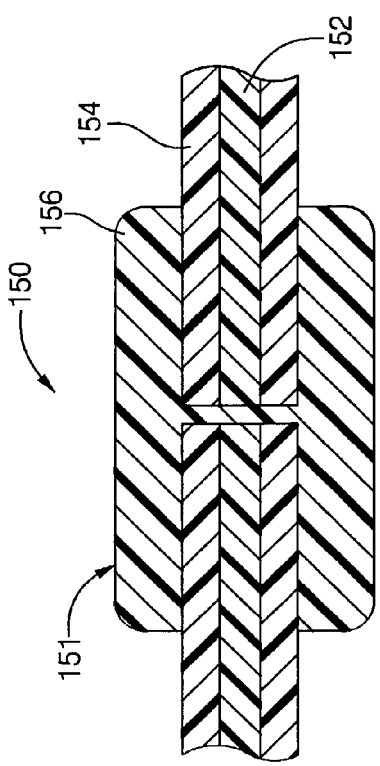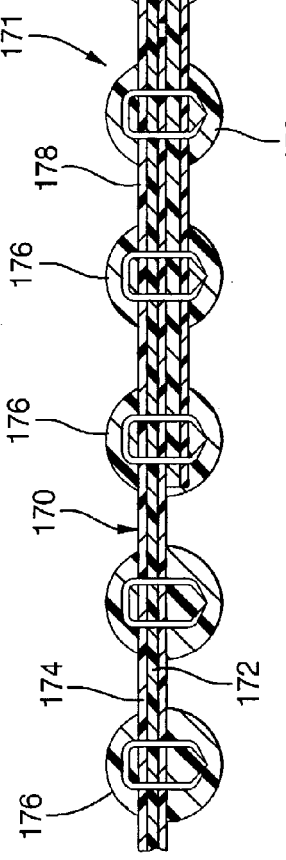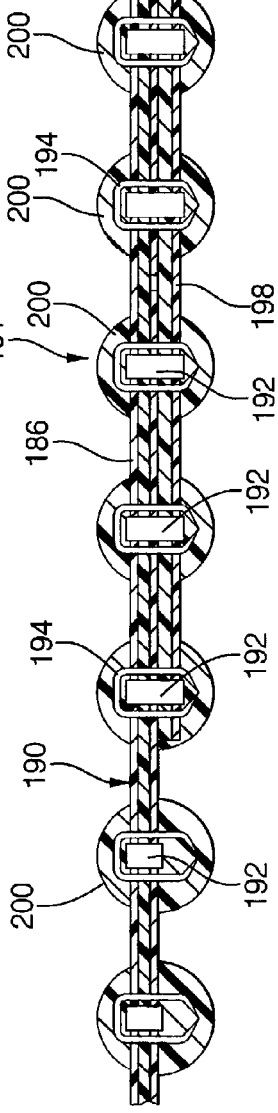

OVER-MOLDED BEADED CABLE FOR DRIVING APPLICATIONS

CROSS REFERENCE TO RELATED APPLICATION

This patent application is a continuation-in-part of U.S. patent application Ser. No. 10/153,016 filed May 21, 2002 and entitled "Over-molded Beaded Cable for Driving Applications".

FIELD OF INVENTION

The present invention relates generally to driving cables and more specifically to over-molded beaded driving cables.

BACKGROUND OF THE INVENTION

Beaded driving cables are often used in products that require connection of two or more devices for automotive and non-automotive systems. Typical beaded driving cables consist of a beaded core and end fittings. The end fittings are located at either end of the cables and provide connection points for other devices. The inner core of these cables may be coated with an outer jacket, or, alternatively, may be uncoated. It is desirable to increase the pulling strength of the beads for high load applications, such as pulling a door or lift gate. In automotive systems, a beaded driving cable may be used in a variety of applications, including sliding doors, lift gates, hood and trunk openers, and windows and latches. Thus, there exists a need for a beaded driving cable with increased pulling strength.

Further, in automotive and non-automotive systems, beaded driving cables may create vibrations and noise when in use. It is also desirable to increase the flexibility for applications of smaller bending radius. Thus, there exists a need for a beaded driving cable with increased flexibility and strength that can provide a wide range of automotive and non-automotive applications while improving noise and vibrations.

SUMMARY OF THE INVENTION

Accordingly, it is an object of the present invention to provide an improved beaded driving cable.

It is a further object of the present invention to provide an over-molded beaded driving cable with increased strength and flexibility, which is capable of high load performance and suitable for applications of smaller bending radius.

It is another object of the present invention to provide a method of making an over-molded beaded driving cables for use in automotive and non-automotive driving systems.

It is an additional object of the present invention to provide an improved driving system that uses a lightweight over-molded beaded driving cable to reduce noise and vibration while increasing the strength and flexibility of the driving system.

In accordance with the above and other objects of the present invention, an over-molded beaded cable is provided.

In one aspect, the over-molded beaded cable has an inner core member with a plurality of inner core structures protruding from an exterior surface of the inner core member. The inner core structures may be an integral component of the inner core member and positioned at regular intervals with respect to each other. Alternatively, the inner core structures may be imbedded within the inner core filaments, or placed around the inner core member in a secure fashion.

The inner core member and the inner core structures may have an outer jacket therearound. Each inner core structure is encapsulated within the outer jacket and an outer bead member. In this position, the inner core structure and the outer bead member interlock with respect to each other and form a beaded driving cable often capable of high pulling strength and flexibility.

In another aspect the inner core member of the over-molded beaded driving cable can also include one or more end fitting members positioned adjacent to at least one end portion to provide an open loop cable. Alternatively, the over-molded driving cable may include the structure and processing which forms the connection for a closed loop cable.

In still another aspect, the over-molded beaded cable has a plurality of clamps that are positioned at regular intervals along an outer surface of the cable. The clamps serve as seats that are embedded in beads that are over-molded onto the exterior surface of the cable. Alternatively the over-molded beaded cable may have pins that are positioned at regular intervals along the cable and protrude from the outer surface of the cable. The pins also serve as seats that are embedded in the beads that are over-molded onto the exterior surface of the cable. The pins may be used alone or in combination with the clamps.

In yet another aspect the over-molded beaded cable has a seamless connection structure for forming a closed loop of beaded cable in which the cable ends are embedded in one or more over-molded beads. The seamless connection structure may include pins and/or clamps.

Further objects and advantages of the invention will be apparent from the following description and appended claims, reference being made to the accompanying drawings forming a part of the specification, wherein like reference characters designate corresponding parts in several views.

BRIEF DESCRIPTION OF THE DRAWINGS

FIG. 1 is an illustration of an open loop driving cable in accordance with a preferred embodiment of the present invention;

FIG. 2 is an illustration of a closed loop driving cable in accordance with a preferred embodiment of the present invention;

FIG. 3 is a cross-sectional view of an over-molded beaded driving cable in accordance with an embodiment of the present invention;

FIG. 4 is a concentric cross-sectional view of an over-molded inner core structure and outer bead member configuration of the present invention as shown in FIG. 3;

FIG. 9 is a cross-sectional view of an over-molded beaded driving cable with a pre-formed inner core in accordance with a further embodiment of the present invention;

FIG. 10 further is concentric cross-sectional view of an outer bead member and pre-formed inner core configuration in accordance with FIG. 9;

FIG. 11 is a schematic view of an alternative over-molded beaded driving cable in accordance with the present invention; and FIG. 12 is a schematic view of another alternative over-molded beaded driving cable in accordance with another embodiment of the present invention.

FIG. 17 is a longitudinal cross-sectional view of another over-molded beaded driving cable having associated metal clamps and metal pins serving as seats for over-molded beads;

FIG. 18 is a transverse cross-sectional view of the over-molded beaded driving cable that is shown in FIG. 17;

FIG. 19 is a longitudinal cross-sectional view of an over-molded driving cable having a seamless connection structure for forming a closed loop of beaded cable;

FIG. 20 is a longitudinal cross-sectional view of another over-molded beaded driving cable of the invention having a seamless connection structure for forming a closed loop of beaded cable;

FIG. 21 is a longitudinal cross-sectional view of another over-molded beaded driving cable of the invention having a seamless connection structure for forming a closed loop of beaded cable;

FIG. 22 is a longitudinal cross-sectional view of another over-molded beaded driving cable of the invention having a seamless connection structure for forming a closed loop of beaded cable; and FIG. 23 is a longitudinal cross-sectional view of another over-molded beaded driving cable of the invention having a seamless connection structure for forming a closed loop of beaded cable.

DETAILED DESCRIPTION OF THE PREFERRED EMBODIMENT

Figure 5:
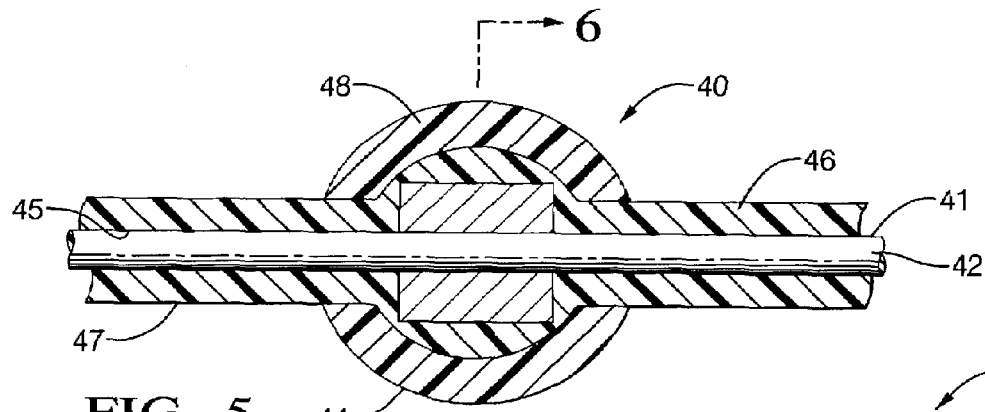
FIG. 5 is a cross-sectional view of an another embodiment of an over-molded beaded driving cable with clamps functioning as inner core structures in accordance with the present invention.

Turning to FIG. 1, there is shown, an external view of an open loop over-molded beaded driving cable 10 in accordance with the present invention. In this view, the over-molded beaded cable 10 includes a cable line 12 having an exterior surface 15, a first end portion 11, and a second end portion 13. A plurality of outer bead members 14 are affixed to the exterior surface 15 of the cable line 12. The outer bead members 14 are positioned in a specific pattern between the first end portion 11 and the second end portion 13 of the cable line 12. A first end fitting member 16 is positioned at the first end portion 11 of the open loop over-molded beaded driving cable 10. A second fitting member 18 is positioned at the second end portion 13 of the over-molded beaded driving cable 10 to connect or attach to other devices. In a typical drive system, the open loop over-molded beaded driving cable 10 is positioned on and extends between two or more devices, permitting the movement of the devices. An automobile lift gate and sliding door are typical automotive applications for this embodiment of the over-molded beaded cable. The driving cable 10 may also be sued in non-automotive applications.

Turning now to FIG. 2, there is shown an external view of another embodiment of the present invention, a closed loop over-molded beaded cable 20. In this embodiment, a cable line 22 has an exterior surface 23 and at least one end fitting member 25 to form a connection for the closed loop over-molded beaded cable 20. The end fitting members 16, 18 and end fitting member 25 may be comprised of plastics, including polyamides, such as molding nylon 6 and nylon 66,polyester, liquid crystal polymer, acrylonitrile-butadiene-styrene (ABS), polypropylene, polyethylene, polyurethane, polycarbonate and Vectra™. High strength plastics are preferred, such as an ABS polycarbonate blend (ABS/PC), and nylon 6 and nylon 66 each with approximately 10 to 33 weight percent fiberglass component. Alternatively, the end fitting members 16, 18 and end fitting member 25 may be comprised of metal, such as steel, stainless steel, zinc, as zinc die cast, aluminum, copper and various alloys. Often, the metal end fittings may be clamps, in which case zinc and steel are the preferred materials to comprise the clamps.

A plurality of outer bead members 24 are positioned in a specific pattern and affixed to the exterior surface 23 of the cable line 22. The closed loop over-molded cable 20 can be used in a variety of automotive and non-automotive applications, such as when a driving system includes a sprocket of similar device. The exterior surfaces 15, 23 of the cable line 12, 22 of both the open-loop cable 10 and the closed loop cable 20 may be coated with a protective layer, such as lubricant, adhesive or other applicable materials, depending upon the desired application of the driving cable 10, 20.

When viewed collectively, FIGS. 1, 2, and 3 depict the external and internal structure an over-molded beaded driving cable 10, 20, 30. As shown in FIG. 3, which illustrates a preferred embodiment of the present invention, the driving cable 30 includes an inner core member 32 with a plurality of inner core structures 34 disposed therearound, as discussed in detail below. The driving cable 30 may also include an outer jacket 36, which may be added by extruding or coating the inner core member 32 with a non-metallic material, or by braiding yarn, strand or threadline over the inner core member 32. Further illustrated in FIG. 3, each outer beard member 38 concentrically encases an inner core structure 34. The inner core structures 34 and the outer bead members 38 are placed in a pattern of distance intervals. The exact distance and placement pattern of the beads is determined by the particular application and may obviously vary.

Looking more closely at a preferred embodiment of the present invention, FIG. 3 is a cross-sectional view of an outer bead member 38 and inner core structure 34 configuration of an over-molded beaded driving cable 30. In this preferred embodiment, an inner core member 32 is comprised of a plurality of fibers (not shown). High performance polymer fibers are preferred, such as Liquid Crystal Polymer Vectran™ fiber, aromatic polyester, aromatic polyamide, and high density and ultra-high molecular weight polyethylene, for high tensile strength and better flexibility. Other synthetic fibers may include compositions of polyamide, including nylon 6, and nylon 66, polyester, polypropylene, liquid crystal polymer and other synthetic materials known to those skilled in the art. In addition, natural fibers such as cotton, wool, silk, and jute in the form of yarn, strand or thread may be used to form the inner core member 32. Alternatively, metal wires such as galvanized steel, steel and stainless steel cable (7×19, 7×7, for example), and copper may be used. The materials included here are examples and it is understood that a variety of other materials known to those skilled in the art, metallic and non-metallic, may form the fibers of the inner core member 32.

In a preferred embodiment, as discussed above, the inner core member 32 is constructed of continuous filament structures which may be braided, twisted or uni-directed. The exact configuration of the inner core member 32 is determined by the desired application. An exterior surface 31 of the inner core member 32 may be coated with a layer of lubricant, adhesive or other coating.

Also shown in FIG. 3, the inner core member 32 has a plurality of inner core structures 34 attached therearound. The shapes of the inner core structures 34 may be determined according to the desired application. These inner core structures 34 may be spherical, rectangular, elliptical, cylindrical, or a variety of other shapes according to the requirements for a desired application. The inner core structures 34 can be comprised of plastics, including polyamides, such as molding nylon 6, and nylon 66, polyester, liquid crystal polymer, polypropylene, polyethylene, polyurethane, polycarbonate and Vectra™. High strength plastics are preferred, such as acrylonitrile-butadiene-styrene (ABS), thermoplastic polyurethane (TPU) and Nylon 6 and Nylon 66 each with approximately 10 to 33 weight percent fiberglass component. In addition, the inner core structures 34 may be formed of composites, metals or materials known to those skilled in the art. The inner core structures 34 may be clamps, preferably comprised of zinc or steel. The inner core structures 34 can be formed by various methods, including injection, pultrusion, clamping or other means which are known to those skilled in the art. The exact composition and formation of the inner bead structures 34 will be determined by the desired application and method of manufacture.

FIG. 3 further depicts an outer jacket 36 surrounding the inner core member 32 and the inner core structures 34. The outer jacket 36 may be added by extruding or coating the inner core member 32 with a non-metallic material, or by braiding yarn, strand or threadline over the inner core member 32. The outer jacket 36 may be comprised of materials similar to the inner core member 32, namely, metal wires, synthetic fibers, threads, natural fibers and other materials known to those skilled in the art. High performance polymer fibers are preferred, such as Liquid Crystal Polymer Vectran™ fiber, aromatic polyester, aromatic polyamide, and high density and ultra-high molecular weight polyethylene, for high tensile strength and better flexibility. Other synthetic fibers may include compositions of polyamide, including nylon 6, and nylon 66, polyester, polypropylene, liquid crystal polymer and other synthetic materials known to those skilled in the art. In addition, natural fibers such as cotton, wool, silk, and jute in the form of yarn, strand or thread may be used to form the inner core member 32. Alternatively, metal wires such as galvanized steel, steel and stainless steel cable (7×19, 7×7, for example), and copper may be used.

It is preferred that the wires and fibers of the inner core member 32 and the outer jacket 36 both be of a continuous filament structure with a diameter from 2.0 to 250.0 microns, although 5.0 to 50.0 microns is further preferred. Alternatively, the outer jacket 36 may be comprised of elastomeric compounds, including but not limited to rubbers and thermoplastic olefins. An interior surface 35 of the outer jacket 36 is in contact with the exterior surface 31 of the inner core member 32 and surrounds the inner core member 32 and the inner core structures 34.

An outer bead 38 of larger diameter than the inner core structure 34 is concentrically placed over the inner core structure 34 of the inner core member 32. The outer bead 38 may be comprised of plastic, such as polyamide, polyester, liquid crystal polymer, polypropylene, polyethylene, acrlonitrile-butadiene-styrene (ABS) and polyurethane, or metal, such as steel stainless steel, zinc, such as zinc die cast, aluminum, copper, and alloy. Suitable materials include molding nylon 6, nylon 66, and Vectra™. The preferred composition for the outer beads 38 are high strength and high wear resistance plastics which provide a cable with improved wear resistance and less operational noise. Preferred materials for the outer beads 38 are liquid crystal polymer, Nylon 6 and Nylon 66,each with approximately 10 to 33 weight percent fiberglass component and thermoplastic polyurethane (TPU). Often, a TPU blend is preferred to achieve the desired strength and wear resistance, for example thermoplastic polyurethane and polycarbonate blend (TPU/PC), such as Texin™ 4210, and TPU/PU 2102™.

The outer bead member 38 is molded or otherwise attached over the outer jacket 36. In this position, the inner core structure 34 and the outer bead 38 interlock and provide a cable with increased strength. An exterior surface 37 of the outer jacket 36 may also be treated further with a lubricant, adhesive or coating material depending upon the desired application.

FIG. 4 illustrates more closely the concentric positioning of the inner core member 32, the inner core structure 34, the outer jacket 36 and the outer bead member 38. This concentric configuration provides an over-molded beaded driving cable 30 which often achieves greater strength and flexibility than current driving cables.

FIG. 5 illustrates an additional embodiment of the over molded beaded driving cable 40. In this embodiment, the driving cable 40 includes an inner core member 42 with an exterior surface 41 and a plurality of inner core structures that are clamps 44. The inner clamps 44 may be comprised of plastics, resins, composites, metals, or other materials known to those skilled in the art and may be pre-clamped to the exterior surface 41 of the inner core member 42. Inner core clamps 44 comprised of zinc or steel are preferred. The inner clamps 44 may be over-molded or attached to the inner core member 42 in a manner that meets the desired application and process of making the driving cable 40.

Figure 6:
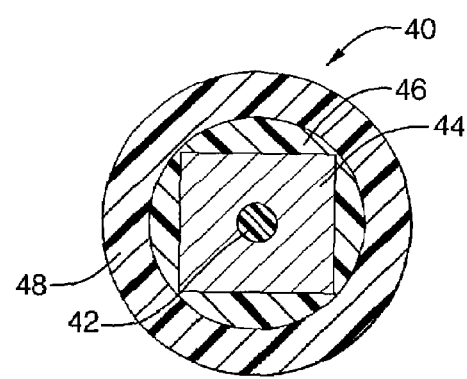
FIG. 6 is a concentric cross-sectional view of the inner clamp and outer bead member configuration shown in FIG. 5.

In this embodiment, as further illustrated in FIG. 5, an outer jacket 46 surrounds the inner core member 42 including the plurality of inner clamps 44. The interior surface 45 of the outer jacket 46 is in contact with the exterior surface 41 of the inner core member 42. A plurality of outer beads 48 of a diameter larger than the inner clamps 44 are placed on the exterior surface 47 of the outer jacket 46. The outer beads 48 are positioned concentrically over the inner clamps 44 and subsequently molded onto the outer jacket 46. FIG. 6 is a cross-sectional view of the concentricity of the inner core member 42, the inner clamp 44, the outer jacket 46 and the outer bead member 48.

Figure 7:
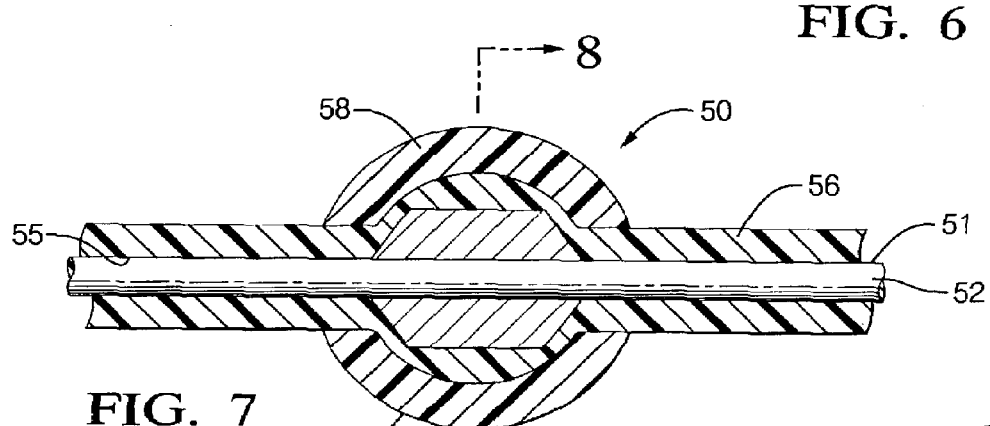
FIG. 7 is a cross-sectional view of another embodiment of an over-molded beaded driving cable comprising a molded inner core with inner core structures in accordance with the present invention.

An over-molded beaded driving cable 50, as viewed in FIG. 7, further comprises a molded inner core member 52 and a plurality of inner core structures comprised of shaped sections 54 of the molded inner core member 52. In this configuration, the molded inner core member 52 is often constructed of interwoven filaments, where upon the inner core filaments are molded to form shaped sections 54.

Figure 8:
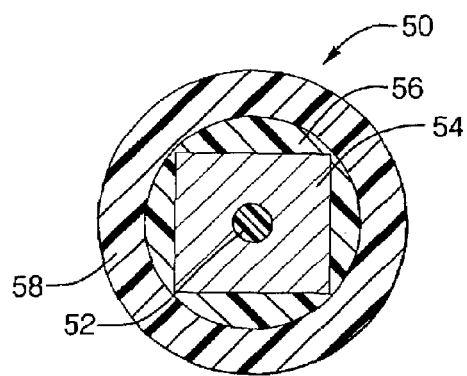
FIG. 8 is a concentric cross-sectional view of an outer bead member and molded inner core with inner core structure configuration shown in FIG. 7 in accordance with the present invention.

Alternatively, the shaped sections 54 can be constructed of a resin material which is applied to the inner core member 52. Following the pre-resinating of the inner core member 52, the resin is molded and shaped into any of a variety of shapes to satisfy the requirements of a desired application. As in other embodiments of the present invention, an outer jacket 56 may surround the pre-resinated or molded inner core member 52 and shaped sections 54. An interior surface 55 of the outer jacket 56 is in contact with an exterior surface 51 of the molded inner core member 52 with shaped sections 54. A plurality of outer bead members 58 are placed on the exterior surface 57 of the outer jacket 56 in position concentric to each shaped section 54. FIG. 8 further illustrates the concentric positioning of the molded inner core member 52, the shaped section 54, the outer jacket 56 and the outer bead members 58.

In a preferred embodiment, as viewed in FIG. 9, an over-molded beaded driving cable 60 with a pre-formed inner core member 62 is shown. In this embodiment, the pre-formed inner core member 62 is often constructed of metals, plastics, rubbers, composites, elastomers, or materials known to those skilled in the art. The pre-formed inner core member 62 includes a plurality of inner core structures which are shaped sections 63 of the pre-formed inner core member 62. The shaped sections 63 protrude in distinct shapes from the exterior surface 61 of the pre-formed inner core member 62. An interior surface 65 of an outer jacket 66 may surround the pre-formed inner core member 62 at the exterior surface 61. As in other embodiments of the present invention, a plurality of outer bead members 68 is placed on the exterior surface 67 of the outer jacket 66. The outer bead members 68 are positioned concentrically around the shaped sections 63 of the pre-formed inner core member 62.

The over-molded beaded driving cable 60 with a pre-formed inner core member 62 is a preferred embodiment due to its cost effectiveness and simplicity to produce. FIG. 10 is a cross-sectional view of the concentric arrangement of the preformed inner core 62, the shaped section 63, the outer jacket 66 and an outer bead member 68.

FIGS. 11 and 12 further depict two additional construction options of the over-molded beaded driving cable 70, 80, each having an inner core member 72, 82, a plurality of inner core structures 71, 81, an outer jacket 76, 86 and an outer bead member 78, 88. As depicted in FIG. 11 and FIG. 12, a shape of an inner core structure may be selected from a variety of dimensions and shapes, depending upon the desired application. However, as FIGS. 11 and 12 further illustrate, an external view of the over-molded beaded cable 70, 80 does not indicate the shape, design or configuration of the inner core member 72, 82 and inner core structures 71, 81. The over-molded beaded driving cables 70, 80 have similar external dimensions and appearance, yet have dissimilar internal configurations, and may provide distinct and varied applications for each cable 70, 80.

Figure 14:
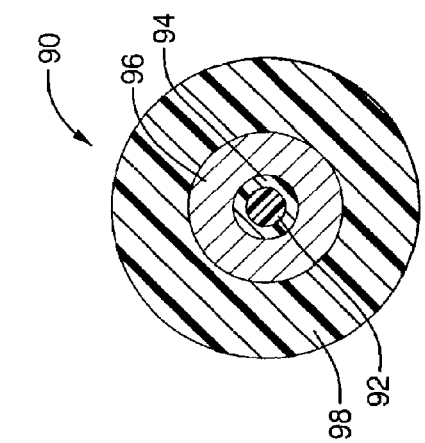
FIG. 14 is a transverse cross-sectional view of the over-molded beaded driving cable shown in FIG. 13.
Figure 13:
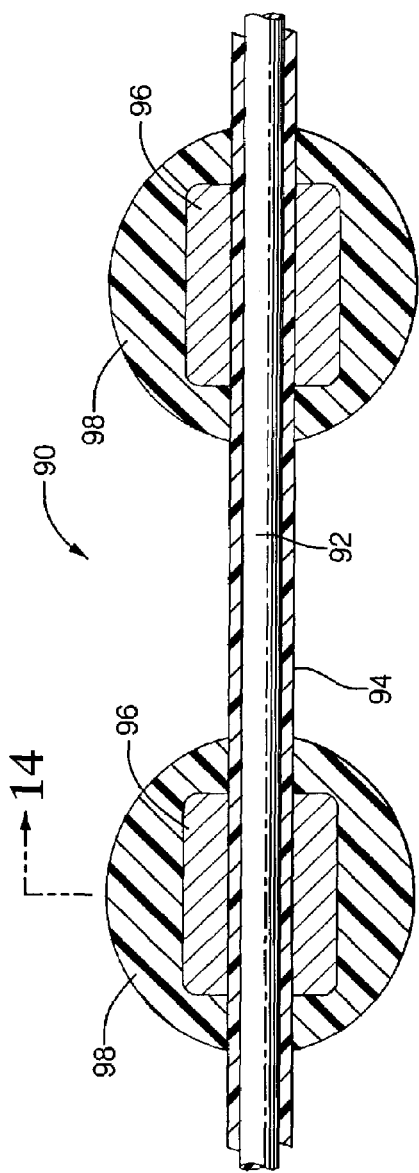
FIG. 13 is a longitudinal cross-sectional view of another over-molded beaded driving cable of the invention having metal clamps on the cable that serve as seats for over-molded beads.

In a preferred embodiment, as viewed in FIG. 13, an over-molded beaded driving cable 90 with a pre-formed inner core member 92 and an outer jacket 94 is shown. A plurality of metal clamps 96 are spaced from each other and attached to the outer jacket 94 along the length of the outer jacket 94. A plurality of plastic beads 98 are molded over the metal clamps 96 and onto the outer jacket 94 so that each metal clamp 96 is embedded in one of the plastic beads 98. FIG. 14 is a cross-sectional view of the over-beaded driving cable 90 taken through one of the beads 98.

Figure 16:
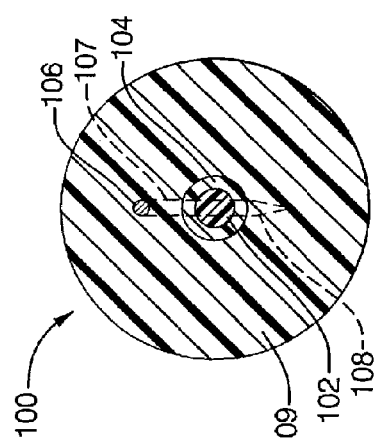
FIG. 16 is a transverse cross-sectional view of the over-molded beaded driving cable shown in FIG. 15.
Figure 15:
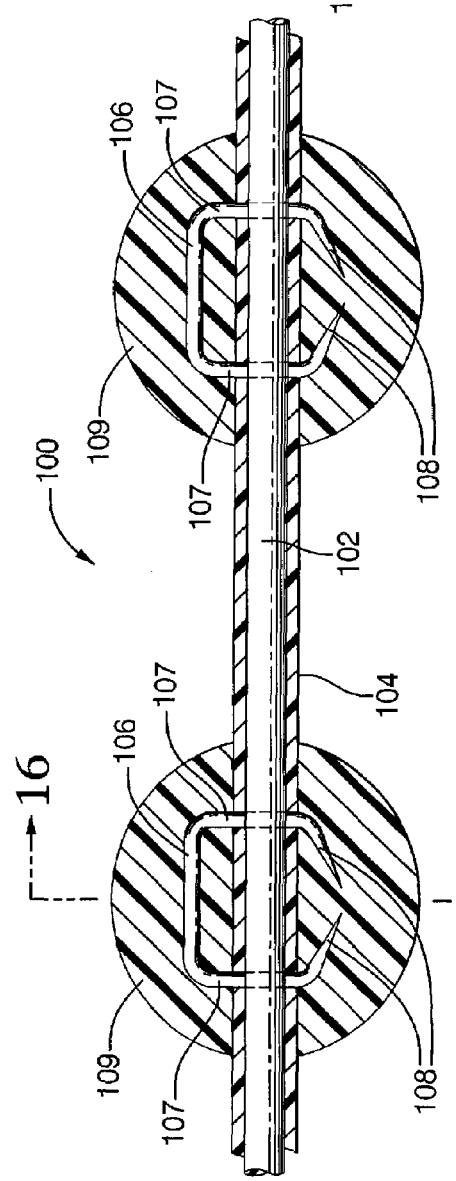
FIG. 15 is a longitudinal cross-sectional view of another over-molded beaded driving cable of the invention having steel pins piercing through the cable that serve as seats for molded over beads.

In another preferred embodiment, as viewed in FIG. 15, an over-molded beaded driving cable 100 with a pre-formed inner core member 102 and an outer jacket 104 is shown. A plurality of metal pins 106, preferably steel, are spaced from each other and attached to the cable 100 along the length of the cable 100. The metal pins 106 are generally U-shaped with spaced apart legs 107 that extend through the outer jacket 104 and inner core member 102. Legs 107 have pointed ends 108 that are bent inwardly toward each other. A plurality of plastic beads 109 are molded over the metal pins 106 and onto the outer jacket 104 so that each metal pin 106 is embedded in one of the plastic beads 109. FIG. 16 is a cross-sectional view of the over-beaded driving cable 100 taken through one of the beads 109.

In still another preferred embodiment, as viewed in FIG. 17, an over-molded beaded driving cable 110 with a pre-formed inner core member 112 and an outer jacket 114 is shown. A plurality of metal clamps 116 are spaced from each other and attached to the outer jacket 114 along the length of the outer jacket 114. A plurality of metal pins 118, preferably steel, are then attached to the cable 110 around each of the respective metal clamps 116. The metal pins 118 are generally U-shaped with spaced apart legs 120 that extend through the outer jacket 104 and inner core member 102 on either side of the metal clamps 116. Legs 120 have pointed ends 122 that are bent inwardly toward each other outwardly of the associated metal clamp 116. A plurality of plastic beads 124 are molded over the metal clamps 116 and metal pins 118 and onto the outer jacket 114 so that each associated metal clamp 116 and metal pin 118 is embedded in one of the plastic beads 124. FIG. 18 is a cross-sectional view of the over-beaded driving cable 110 taken through one of the beads 124.

Referring now to FIG. 19, a longitudinal cross-sectional view of an over-molded beaded driving cable 130 having a seamless connection structure 131 for forming a closed loop of beaded driving cable is illustrated. Cable 130 has a preformed inner core member 132, an outer jacket 134, and a plurality of plastic beads 136 that are molded onto the outer jacket 134 at regular intervals along the length of the outer jacket. The seamless connection structure 131 which splices the ends of the cable 130 together, is formed by inserting a bare inner core member end portion 138 at one end of the cable 130 into a hollow end portion 140 at the other end of the cable 130 which has its inner core member removed. The length of the bare end portion 138 and the corresponding length of the hollow end portion 140 is about two pitches so that each starts at the center of a bead to be over-molded onto the outer jacket 134, passes through an adjacent second bead and terminates at the center of a third bead. The bare end portion 138 is preferably secured in the hollow end portion 140 with a suitable adhesive 141. Plastic beads 136 are then over-molded onto the outer jacket 134 so that abutting ends of the pre-formed inner core 132 and bare end portion 138 are at the center of one molded over bead 136 and the abutting ends of outer jacket 134 and hollow end portion 140 at the center of another molded-over bead 136. While the seamless connection structure 131 is illustrated as including three beads 136, a greater or lesser number may be used depending on the circumstances.

Referring now to FIG. 20, a longitudinal cross-sectional view of an over-molded beaded driving cable 150 having another seamless connection structure 151 for forming a closed loop of beaded driving cable is illustrated. Cable 150 has a preformed inner core member 152, an outer jacket 154, and a plurality of plastic beads 156 that are molded onto the outer jacket 154 at regular intervals along the length of the outer jacket. Only one bead 156 is shown. The seamless connection structure 151 which splices the ends of the cable 150 together, is formed by juxtaposing the ends of the cable 150 and over-molding one of the plastic beads 156 at the splice. In this case, the plastic beads are preferably shaped as elongate cylinders.

FIG. 21 shows another alternative seamless connection structure 161 where the ends of the cable 160 are spaced apart a fair distance but still close enough so that a end portion at each end of the cable 160 is embedded in an over-molded bead 162 in the form of an elongate cylinder.

Referring now to FIG. 22, a longitudinal cross-sectional view of an over-molded beaded driving cable 170 having another seamless connection structure 171 for forming a closed loop of beaded driving cable is illustrated. Cable 170 has a preformed inner core member 172, an outer jacket 174, and a plurality of plastic beads 176 that are molded onto the outer jacket 174 at regular intervals along the length of the outer jacket. The seamless connection structure 171 which splices the ends of the cable 170 together, is formed by overlapping opposite end portions 178 and 180 of cable 170. Each end portion has an end-most part of its outer jacket 174 removed to reduce the thickness of the overlapping opposite end portions 178 and 180. Cable 170 has metal pins 182 like the metal pins 106 described above in connection with cable 100. Thus the overlapping end portions 178 and 180 are fastened together with a plurality of metal pins 182 that are pushed through the cable 170. As before cable 170 is then over-molded with a plurality of plastic beads 176 so that each metal pin 182 is embedded in a plastic bead. While the seamless connection structure 171 includes six plastic beads 176, a greater or lesser number may be included depending on the circumstances.

FIG. 23 shows an over-molded beaded driving cable 190 having another seamless connection structure 191 of the overlapping type for forming a closed loop of beaded driving cable. Cable 190 has overlapping end portions like those described above. However, cable 190 has metal clamps 192 as well as metal pins 194 like the metal clamps 116 and the metal pins 118 described above in connection with cable 110. Thus the overlapping end portions 196 and 198 are fastened together with a plurality of metal clamps 192 and metal pins 194 that are pushed through the cable 190. As before cable 190 is then over-molded with a plurality of plastic beads 200 so that each associated metal clamp 192 and metal pin 194 is embedded in a plastic bead. As indicated above, while the seamless connection structure 191 includes six plastic beads 200, a greater or lesser number may be included depending on the circumstances. Moreover the driving cable 190 may be modified so that only the overlapping end portions 196 and 198 are provided with metal clamps 192 as well as metal pins 194 with the remaining portions of the driving cable 190 having only the metal pins 194.

In accordance with the present invention, an over-molded beaded driving cable comprises an inner core member having a plurality of inner core structures, an outer jacket which may surround the inner core member and inner core structures, and a plurality of outer bead members.

The inner core member may be formed in a variety of configurations. A fiber or wire based inner core member may be a comprised of continuous filament fibers that can be uni-directed, twisted, or braided yarn, strand or threadline. The fashion in which the fibers are interwoven increases the over-all strength of the over-molded beaded driving cable. Preferably, a braided inner core member often provides the strength and flexibility for use in high load application, such as garage doors, and power sliding doors, as well as other automotive and non-automotive applications. A uni-directed inner core member may be applicable for applications such as window systems. An over-molded beaded driving cable with a twisted inner core may exhibit a variety of applications depending upon the twist direction, angle and frequency. An inner core constructed with high twist angle and frequency is more solid and less flexible than an inner core member with lower twist angle and frequency. Although the twisted inner core member can be complex to construct, the twisted inner core member may offer a wide range of applications.

Materials for the inner core member, and the outer jacket as well, may be metal wires, synthetic fibers, threads, natural fibers and a variety of other weavable materials. The diameter of the fiber can be within the range of 2.0 to 250.0 microns, with a preferred range of 5.0 to 50.0 microns.

A preferred embodiment of the over-molded beaded driving cable includes a pre-formed inner core member. In this construction, the inner core member with the inner core structures is formed as a one unit. The inner core structures are shaped sections which protrude from the surface of the inner core member.

The pre-formed inner core member and molded inner core member may be comprised of metals, plastics, composites, elastomers, such as rubbers and thermoplastic olefin, and other suitable materials, including Vectra™. The preformed inner core member can be formed by extrusion, injection, pultrusion, or other means which are known to those skilled in the art.

The inner core structures 34 may be structured separately and attached to the inner core member, such as beads or clamps, or shaped sections of a pre-resinated or molded core member or shaped sections of a pre-formed core member. Separate inner core structures, such as beads or clamps, may be comprised of a wide variety of plastics or metals. The separate inner core structures may be over molded, crimped or die casted onto the inner core member. The method of attachment will vary with the desired application and construction process.

Alternatively, the inner core structures may be shaped sections that are integrally formed with the inner core member, as a molded inner core member or a pre-formed inner core member. The shaped sections of the molded core member may be formed from the inner core materials or a resin material that is applied to the exterior surface of the inner core member. A shaped section may be a bump or protrusion.

In a preferred embodiment, the inner core member is preformed with protrusions that function as inner core structures. In this embodiment, the inner core structures are an integral component of the inner core member. Therefore, no additional production or attachment process is required to include the inner core structures in a driving cable assembly.

The shapes of the inner structures, beads, clamps, and shaped sections will vary with the requirements of the desired application. For instance, the inner core structures and the outer bead members may be spherical, rectangular, elliptical, cylindrical, and a variety of other shapes according to the requirements for a desired application.

The outer jacket of the over-molded beaded driving cable may be added by extrusion or coating the inner core member with a layer of non-metallic material, or braiding yarn, strand or threadline over the inner core member and inner core structures. The material composition and method of applying the outer jacket will be determined by the desired use, and will be known to those skilled in the art. Both the inner core member and the outer jacket may be treated with a lubricant, adhesive or suitable material. The material ratio by weight of the inner core member to outer jacket can be from 10/90 to 90/10. The ratio of 30/70 to 70/30 is preferred.

An outer bead member is concentrically positioned with respect to an inner core structure to provide increased high pulling strength for the beads and the over-molded beaded driving cable. The inner core structures and outer bead members interlock and provide a beaded driving cable which often can be used in high load applications.

In other arrangements, clamps and/or pins may be used as seats for the beads. In these instances, the clamps embracing the outer jacket of the cable while the pins piece the cable.

The over-molded beaded cables may use one or more of the over-molded beads as part of seamless connection structure for forming a closed loop beaded cable.

We claim:

1. A driving cable consisting of
an inner core member;
a plurality of inner core structures protruding from said inner core member;
an outer jacket surrounding said inner core member and said plurality of inner core structures; and
a plurality of outer bead members applied to said outer jacket overlying said inner core structures, said outer bead members being of larger diameter than said inner core structures and each of said inner core structures being concentrically surrounded by a respective one of said outer bead members.

2. The driving cable of claim 1, wherein said inner core member is comprised of a plurality of fibers, said fibers being comprised of a high performance polymer formulation.

3. The driving cable of claim 1, wherein said inner core member is comprised of a liquid crystal polymer formulation.

4. The driving cable of claim 1, wherein the inner core member includes shaped sections that form said plurality of inner core structures.

5. A driving cable comprising:
an inner core member;
a plurality of inner core structures protruding from an exterior surface of said inner core member; and
a plurality of outer bead members, said outer bead members being of larger diameter than said inner core structures and each of said outer bead members concentrically surrounding a respective one of said inner core structures, and
an outer jacket surrounding said inner core member and said plurality of inner core structures.

6. The driving cable of claim 5, wherein said outer jacket is positioned between the inner core member and the outer bead members.

7. The driving cable of claim 1, wherein said outer bead members are comprised of a formulation of a polyamide with about 10 to about 33 weight percent fiberglass.

8. The driving cable of claim 1, wherein said outer bead members are spherical in shape.

9. The driving cable of claim 5 further comprising:
a first and a second end portion of said inner core member, and a first and a second end fitting member, said first and second end fitting member being positioned adjacent to said first and second end portion of said inner core member, respectively.

10. The driving cable of claim 5 further comprising:
a first and a second end portion of said inner core member and an end fitting member, said end fitting member functioning as a connection of said first and second end portions of said inner core member forming a closed loop cable.

11. A driving cable assembly comprising:
an inner core member having a first and a second end portion;
a plurality of inner core structures protruding from an exterior surface of said inner core member;
a plurality of outer bead members, said outer bead members being of larger diameter than said inner core structures and each of said outer bead members concentrically surrounding a respective one of said inner core structures to form an interlocking bead system; and
a first end fitting member being positioned at said first end portion of said inner core member, wherein the plurality of inner core structures are metal pins.

12. The driving cable assembly of claim 11, wherein said end fitting member functions to adjoin said first and second end portions of inner core member forming a closed loop cable.

13. The driving cable assembly of claim 11 further comprising:
a second end fitting member, said second end fitting member being adjacent to said second end portion of inner core member.

14. A driving cable assembly comprising:
an inner core member having a first and a second end portion;
a plurality of inner core structures protruding from an exterior surface of said inner core member;
a plurality of outer bead members, said outer bead members being of larger diameter than said inner core structures and each of said outer bead members concentrically surrounding a respective one of said inner core structures to form an interlocking bead system;
a first end fitting member being positioned at said first end portion of said inner core member, wherein the plurality of inner core structures are either clamps or metal pins; and
an outer jacket surrounding said inner core member and said inner core structures.

15. A driving cable comprising:
an inner core member,
an outer jacket surrounding said inner core member,
a plurality of structures, protruding from an exterior surface of said outer jacket, and
a plurality of outer bead members concentrically surrounding each one of said plurality of structures respectively.

16. The driving cable of claim 15 wherein the structures are clamps.

17. The driving cable of claim 16 further include a metal pin disposed about each of said clamps.

18. The driving cable of claim 17 wherein the metal pins are U-shaped with legs on either side of the clamps, the legs passing through the inner core member and the outer jacket and having pointed ends.

19. The driving cable of claim 15 wherein the structures are metal pins.

20. The driving cable of claim 19 wherein the metal pins are U-shaped with legs that pass through the inner core member and the outer jacket.

21. The driving cable of claim 15 further including a seamless connection structure forming the driving cable into a closed loop.

22. The driving cable of claim 21 wherein the seamless connection structure includes a bare end portion of the inner core member at one end of the cable that is inserted into a hollow end portion of the outer jacket at an opposite end of the cable and at least one of the plurality of beads.

23. The driving cable of claim 21 wherein the seamless connection structure includes overlapping end portions of the cable.

24. The driving cable of claim 23 wherein the seamless connection structure includes a plurality of metal pins that extend through the core and the outer jacket of the cable.

25. The driving cable of claim 24 wherein the seamless connection structure includes a plurality of clamps surrounding the outer jacket.

26. The driving cable of claim 23 wherein the seamless connection structure includes a plurality of clamps surrounding the outer jacket.

27. The driving cable of claim 23 wherein the overlapping end portions have end-most parts of their insulation jacket removed to reduce thickness.

28. The driving cable of claim 27 wherein the seamless connection structure includes a plurality of metal pins that extend through the core and the outer jacket of the cable.

29. The driving cable of claim 27 wherein the seamless connection structure includes a plurality of clamps surrounding the outer jacket.

* * * * *